(12) United States Patent
Deng et al.

(10) Patent No.: US 8,219,552 B2
(45) Date of Patent: Jul. 10, 2012

(54) INFORMATION THEORY BASED RESULT MERGING FOR SEARCHING HIERARCHICAL ENTITIES ACROSS HETEROGENEOUS DATA SOURCES

(75) Inventors: Yu Deng, Hawthorne, NY (US); Murthy V. Devarakonda, Hawthorne, NY (US); Rafah A. Hosn, Hawthorne, NY (US); Ruchi Mahindru, Hawthorne, NY (US); Nithya Rajamani, Hawthorne, NY (US); Soumitra Sarkar, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/575,210

(22) Filed: Oct. 7, 2009

(65) Prior Publication Data
US 2011/0082859 A1    Apr. 7, 2011

(51) Int. Cl.
G06F 17/30    (2006.01)
(52) U.S. Cl. ........................................ 707/728; 707/731
(58) Field of Classification Search .................. 707/728, 707/731, 999.003
See application file for complete search history.

(56) References Cited

U.S. PATENT DOCUMENTS

| | | | |
|---|---|---|---|
| 6,697,818 B2 * | 2/2004 | Li et al. ................................. | 1/1 |
| 6,795,820 B2 | 9/2004 | Barnett | |
| 2009/0112841 A1 | 4/2009 | Devarakonda et al. | |

OTHER PUBLICATIONS

"Different Engines, Different Results", A Research Study by Dogpile.com, Apr. 2007, pp. 1-26.
Meng et al., "Building Efficient and Effective Metasearch Engines", ACM Computing Surveys, vol. 34, No. 1, Mar. 2002, pp. 48-89.
Si et al., "Modeling Search Engine Effectiveness for Federated Search", SIGIR 2005, Salvador, Brazil.
Wiguna et al., "Using Fuzzy Model for Combining and Reranking Search Result from Different Information Sources to Build Metasearch Engine", In Computational Intelligence, Theory and Applications, International conference 9th fuzzy days in Dortmund, Germany, Sep. 18-20, 2006.
Shannon, "A Methematical Theory of Communication", Bell System Technical Journal, 27, pp. 379-423 & 623-656, Jul. & Oct. 1948.
Howe et al., "SavvySearch: A Meta-Search Engine that Learns which Search Engines to Query", AI Magazine, 1997.
Si et al., "A Semisupervised Learning Method to Merge Search Engine Results", ACM Transactions on Information Systems, 21(4), pp. 457-491, 2003.
Larkey et al., "Collection Selection and Results Merging with Topically Organized U.S. Patents and TREC Data", CIKM 2000.

* cited by examiner

*Primary Examiner* — Monica Pyo
(74) *Attorney, Agent, or Firm* — Scully, Scott, Murphy & Presser, P.C.; Louis J. Percello, Esq.

(57) ABSTRACT

A method, system, and computer program product are disclosed for merging search results. In one embodiment, the method comprises identifying a query, splitting the query into sub-queries, and calculating information content for each of the sub-queries. This method also comprises executing each of the sub-queries to obtain a plurality of search results, and combining the search results based on the information content calculated for the sub-queries. In an embodiment, the execution of each of the sub-queries includes identifying a multitude of search results for at least one of the sub-queries; and the combining includes grouping said multitude of search results into a plurality of clusters, and computing a relevance score for each of said clusters. In the embodiment the combining further includes merging the clusters based on the relevance scores computed for the clusters as well as the information content calculated for the sub-queries.

19 Claims, 3 Drawing Sheets

ALGORITHM OF MERGING SEARCH RESULTS

INFORMATION THEORY BASED RESULT MERGING FOR SEARCHING HIERARCHICAL ENTITIES ACROSS HETEROGENEOUS DATA SOURCES

BACKGROUND OF THE INVENTION

1. Field of the Invention

The present invention generally relates to data processing, and more specifically, to searching for data or information in order to answer a query. Even more specifically, embodiments of the invention relate to methods, apparatus and computer program products that are well suited for retrieving information across heterogeneous search indices.

2. Background Art

The Internet and the World Wide Web have become critical, integral parts of commercial operations, personal lives, and the education process. At the heart of the Internet is web browser technology and Internet server technology. An Internet server contains "content" such as documents, image or graphics files, forms, audio clips, etc., all of which is available to systems and browsers which have Internet connectivity. Web browser or "client" computers may request documents from web addresses, to which appropriate web servers respond by transmitting one or more web documents, image or graphics files, forms, audio clips, etc. The most common protocol for transmission of web documents and contents from servers to browsers is Hyper Text Transmission Protocol ("HTTP").

The most common type of Internet content or document is Hyper Text Markup Language ("HTML") documents, but other formats are also well known in the art, such as Adobe Portable Document Format ("PDF"). HTML, PDF and other web documents provide "hyperlinks" within the document, which allow a user to select another document or web site to view. Hyperlinks are specially marked text or areas in the document which when selected by the user, command the browser software to retrieve or fetch the indicated document or to access a new web site. Ordinarily, when the user selects a plain hyperlink, the current page being displayed in the web browser's graphical user interface ("GUI") window disappears and the newly received page is displayed. If the parent page is an index, for example the IBM web site www.patents.ibm.com, and the user wishes to visit each descending link (e.g. read the document with tips on how to use the site), then the parent or index page disappears and the new page is displayed (such as the help page).

As the computing capacity of web browser computers increases and the communications bandwidth to the web browser computer increases dramatically, one challenge for organizations that provide Internet web sites and content is to deliver and filter such content in anticipation of these greater processing and throughput speeds. This is particularly true in the realm of web-based applications, and in the development of better and more efficient ways to move user-pertinent information to the desktop or client. However, today's web browsers are in general unintelligent software packages. As these browsers currently exist, they require the user to manually search for any articles or documents of interest to him or her, and these browsers are often cumbersome in that they frequently require a download of many documents before one of germane interest is found.

Search engines introduce some level of "intelligence" to the browsing experience, wherein a user may point his unintelligent web browser to a search engine address, enter some keywords for a search, and then review each of the returned documents one at a time by selecting hyperlinks in the search results, or by re-pointing the web browser manually to the web addresses returned. However, search engines do not really search the entire Internet; rather they search their own indices of Internet content which has been built by the search engine indexing software, usually through a process of analyzing information contained in various repositories, one example of which is web content on the Internet.

As presented in the Dogpile report [Different Engines, Different Results. *A Research Study by Dogpile.com*. April 2007], no single web search engine can retrieve all of the good search results by its own. For example, by searching only Google, a searcher can miss 72.7% of the Web's best first page search results.

To address this problem, another technology has been developed and is known in the art as "MetaSearch engine". A MetaSearch engine does not keep its own index, but rather submits a query to multiple, component search engines simultaneously, and returns to the user the highest ranked results from each of these search engines. The MetaSearch engine may, for example, return the top 5 listings from 4 search engines. As a result, the more likely interesting information may be filtered out. Today a number of MetaSearch engines have been constructed and are available on the internet such as MetaCrawler and Dogpile.

This invention is also related to the distributed information retrieval (IR) technology. Without loss of generality, we use the context of metasearch to illustrate the idea. But it is applicable to the distributed a environment.

In a metasearch system, each component search engine takes independent decisions regarding which documents to index, how many documents to retrieve given a query, how to rank search results, and so on [Weiyi Meng, Clement Yu and King-Lup Liu. Building Efficient and Effective Metasearch Engines. ACM Computing Surveys, Vol. 34, No. 1, March 2002, pp. 48-89]. Due to such heterogeneity, it is difficult to combine results from component search engines efficiently and effectively. U.S. Pat. No. 6,795,820, for "Metasearch Technique That Ranks Documents Obtained From Multiple Collections," discloses a framework to combine documents from component search engines, taking both local and global statistics into account when sorting the documents. Wiguna, et al., in "Using Fuzzy Model for Combining and Reranking Search Result from Different Information Sources to Build Metasearch Engine" (Wiratna S. Wiguna, Juan J. Fernández-iébar and Ana Garcia-Serrano, *Computational Intelligence, Theory and Applications*, International conference $9^{th}$ fuzzy days in Dortmend, Germany, Sep. 18-20, 2006), presents a way of using fuzzy logic to combine results from distributed search engines. But their approach is only applicable for combining documents.

None of the existing approaches is appropriate for combining search results with different semantics, such as people versus departments or pages versus books. Having data sources which have different semantics, yet which are connected in certain ways, is very common in enterprises today, e.g., as mentioned in U.S. Patent Application Publication No. 2009/0112841, for "Document Searching Using Contextual Information Leverage and Insight." What is needed is a methodology to properly combine these search results and sort them.

BRIEF SUMMARY

Embodiments of this invention provide a method, system, and computer program product for merging search results. In one embodiment, the method comprises identifying a query, splitting the query into sub-queries, and calculating information content for each of the sub-queries. This method also comprises executing each of the sub-queries to obtain a plurality of search results, and combining the search results based on the information content calculated for the sub-queries.

In one embodiment, the execution of each of the sub-queries includes identifying a multitude of search results (e.g. documents) for at least one of the sub-queries; and the combining includes grouping said multitude of search results into a plurality of clusters (each cluster represents a high level entity, such as books), and computing a relevance score for each of said clusters. In one embodiment the combining further includes merging the clusters based on the relevance scores computed for the clusters and information content computed for the sub-queries.

In one embodiment, the execution of each of the sub-queries includes identifying a plurality of search results for each of the queries; the combining includes for each of the queries, grouping the plurality of search results identified for said each query into one or more clusters; and the combining further includes computing a relevance score for each of the clusters, and combining the clusters based on the relevance scores computed for the clusters and information content computed for the sub-queries.

In one embodiment, the sub-queries include a first sub-query and a second sub-query; and the executing each of the sub-queries includes executing the first sub-query to identify a plurality of first-class entities (such as books or departments), and executing the second sub-query to identify multitude of second class entities (such as pages in the books or people in the departments), each of the second-class entities being associated, according to a defined criteria, with a respective one of the first-class entities. Also, in this embodiment, the combining includes clustering the second-class entities into a plurality of clusters based on the one of the first-class entities to which each of the second class entities belongs, and assigning a relevance score to each of the clusters.

In one embodiment of the invention, a user's intention in a query is estimated dynamically and used to combine returned information from different data sources. In this method, users do not need to provide feedback as required by learning approaches, such as L. Si and S. Callan in "A Semisupervised Learning Method to Merge Search Engine Results," ACM Transactions of Information Systems, 21(4), (pp. 457-491) (2003). In addition, this embodiment of the invention solves the problem of combining results with completely different semantics that previous approaches could not handle.

Embodiments of the invention enable searching and result merging across heterogeneous indices, which include structured, unstructured and semi-structured data sources. Embodiments of the invention enable searching and result merging at an entity level.

DETAILED DESCRIPTION

Figure 1:
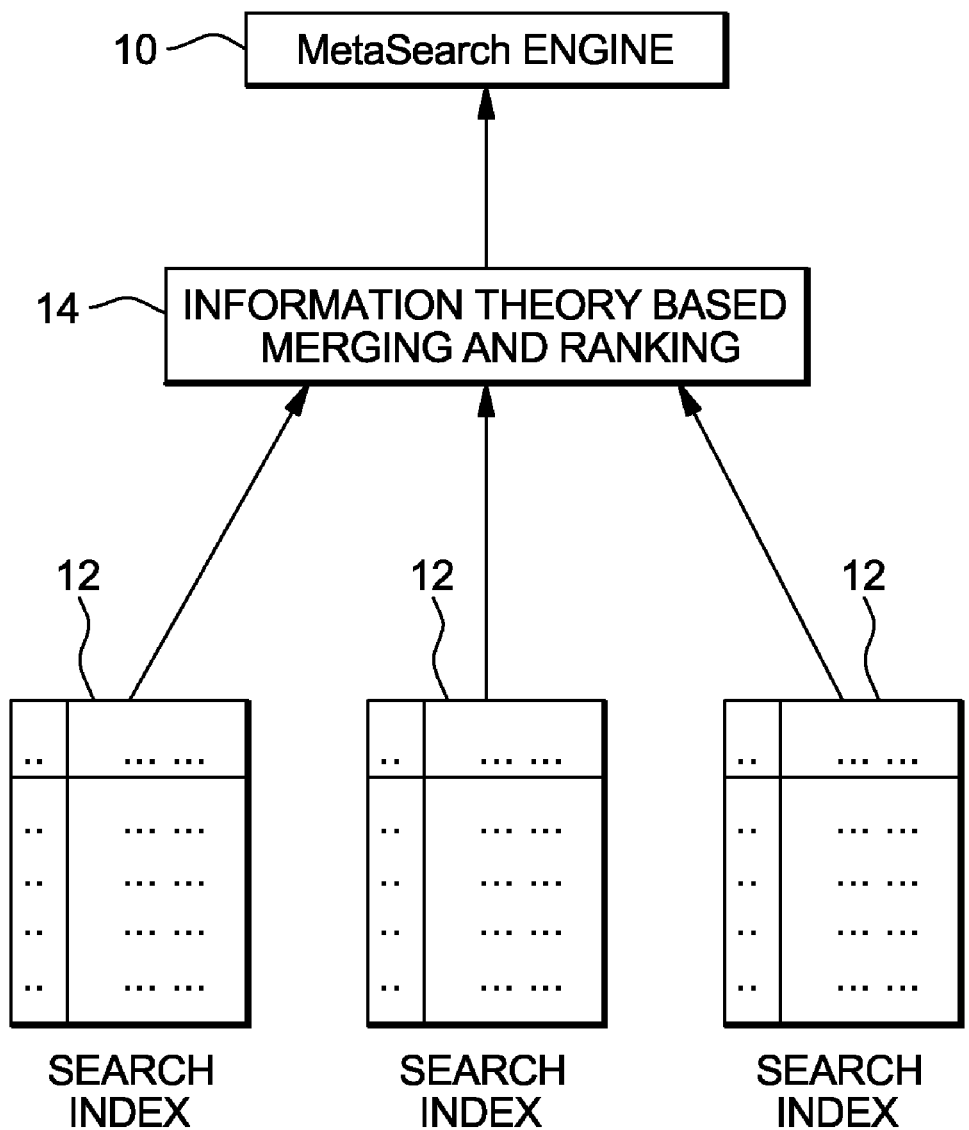
FIG. 1 illustrates an information theory based merging and ranking method according to an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RE, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention provides an information theory based approach to combine search results from heterogeneous search indices. More specifically, the invention uses information content of a query (information need) to estimate how important this query is to an end user; and once the information content of the queries is computed, the search results are combined in a reasonable way.

With reference to FIG. 1, in one embodiment of the invention, a metasearch engine 10 (this could also be a search engine based on distributed IR technology) receives a query, splits the query into a plurality or a multitude of sub-queries, and executes each sub-query using a respective single search index 12. The search results are then combined, as represented at 14, using information theory based merging and ranking.

For example, a metasearch engine has access to a keyword search index on books and a database containing metadata about those books (e.g., publisher, publishing date and author name). If a user is looking for books published by O'Reilly on C programming, it is very likely that the user's focus is on C programming because O'Reilly has published a lot more books in other topics. Therefore, the results from the keyword search index are expected to have higher weight. On the other hand, if the user is looking for books written by a specific author on C programming, then the results from the database should get higher weight because now the user is paying more attention to the author's name.

The above examples illustrate the intuition behind this invention. When combining results from heterogeneous component search engines, the invention considers what is more important to the user and assigns dynamic weights to the sub-queries. None of the existing approaches has touched upon that aspect of search. They rely on the characteristics of the search engines (such as term frequency and document frequency) when determining the ranking of search results, which may not reflect the user's intention.

As another example, suppose a user is looking for business engagements involving both "iSeries" server and disaster recovery services. During resource selection phase, the search for "iSeries" is routed to a keyword search index which contains unstructured documents, while the search for disaster recovery services is routed to a database containing engagement level information, such as services scope and total contract value. With such semantically different data content, previous approaches cannot be used to simply sort the results returned by different search engines and to combine them for presentation. The present invention provides a better way to carefully combine the results together and then sort them at the business engagement level.

One observation is that when users specify multiple information requirements in a query (such as "iSeries" and disaster recovery), normally one of the query components (sub-queries) is their primary focus and the other components provide context. Specifically in the example above, "iSeries" is the primary focus of what the user is looking for while "disaster recovery" provides additional context. This is because in the data collection being used, "iSeries" is a rare term compared to "disaster recovery". Information content is used to quantify this abstract concept.

In information theory [see C. E. Shannon, "A Mathematical Theory of Communication," Bell System Technical Journal, 27, pp. 379-423 & 623-656, July and October, 1948], information content (a/k/a self-information) measures information associated with the outcome of a random variable. It is computed as $-\log(p(E))$, where $p(E)$ is the probability of event E. The lower the probability of an event E, the high the information content of E.

There are many ways to compute the probability of a query. As an example, suppose there is information about N business engagements, in the database being searched. Suppose the query Q on disaster recovery has information about m engagements returned. Then the probability $p(Q)$ can be computed as m/N and the information content of Q can be computed as $-\log p(Q)$.

Figure 2:
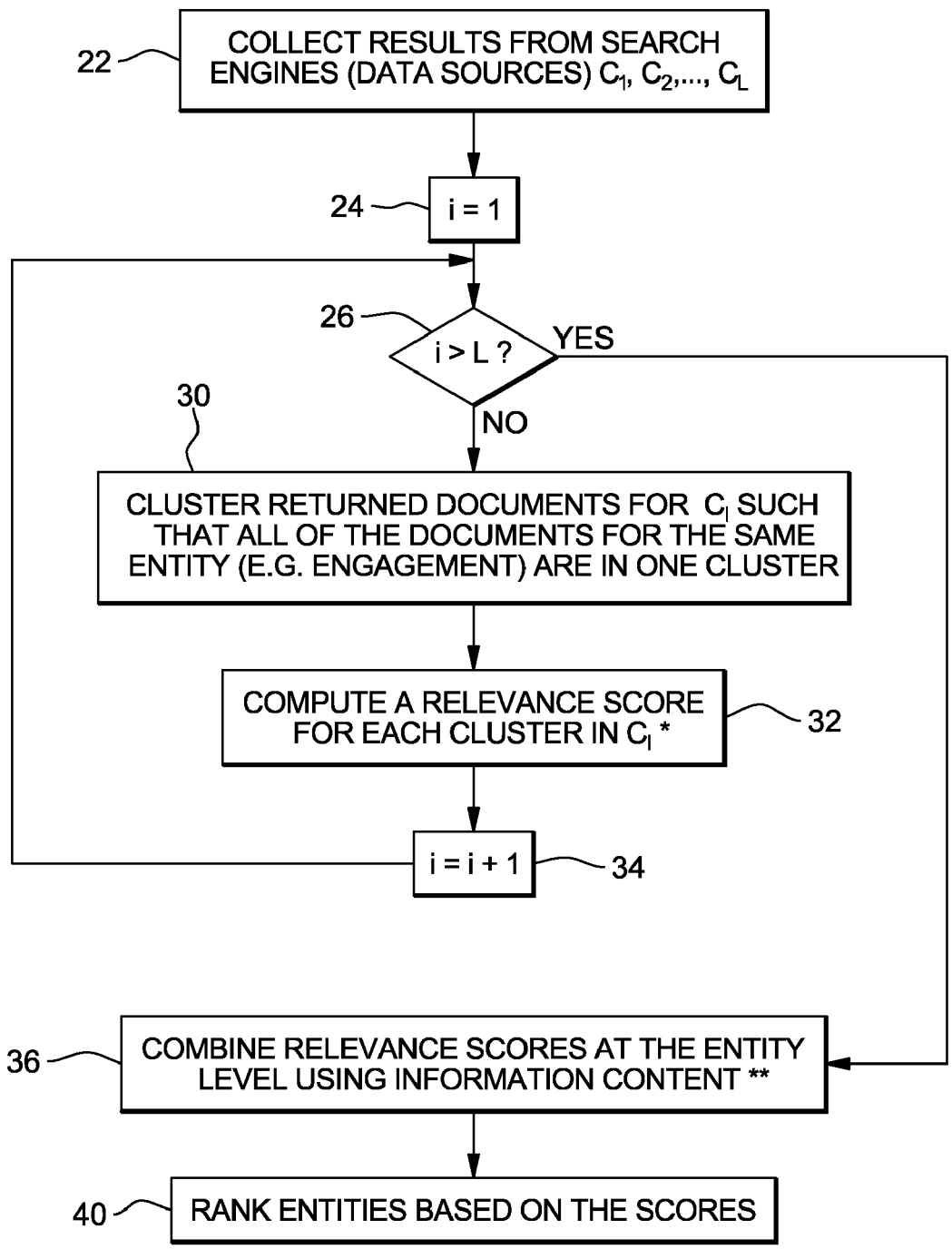
FIG. 2 shows an algorithm for merging search results in accordance with an embodiment of the invention.

Once we compute the information content of the queries (representing the information requirements of the user), the returned results are merged in a reasonable way. FIG. 2 illustrates one way to merge the search results. For instance, suppose the data source $C_1$ is provided for searching the disaster recovery services and $C_2$ is provided for searching "iSeries" server related information. In addition, suppose at step 22, $C_1$ returns business engagements attached with relevance scores, and C2 returns documents also attached with relevance scores. A data source-independent score is computed, at steps 24, 26, 30, 32 and 34, for each returned business engagement because users are interested in information at the engagement level. Therefore, at step 30, documents returned from C2 are clustered based on the engagements they belong to, and at step 32 a score is computed for each cluster. There are many ways to compute scores for clusters. One way, for example, is to use average score, as shown in equation (1):

$$\frac{\sum_{i=1}^{n} S_{C_2}(d_1)}{n} \quad (1)$$

where n is the number of documents returned from $C_2$ and $S_{C_2}(d_i)$ represents the score of the ith returned document.

Then at step 36 the merged score of each returned business engagement from C1, or C2, or both can be computed as shown in equation (2):

$$\text{score(engagement)} = a_1 s_{C_1} + a_2 \frac{\sum_{i=1}^{n} S_{C_2}(d_1)}{n} \quad (2)$$

where $S_{C_1}$ is the score attached to the returned engagement from $C_1$, $a_1$ is the information content of the query sent to $C_1$ and $a_2$ is the information content of the query sent to $C_2$. The entities are then ranked, at step 40, based on the computed scores.

The algorithm shown in FIG. 2 is a generalized version of the above example. In addition, the information content of the sub-queries is pre-computed and the algorithm takes the information content as input. At step 32 of FIG. 2, the relevance score of a cluster can be computed using formula (1). At step 36, the merged relevance scores at entity level can be computed using formula (2), which can be extended for multiple search engines (data sources).

Embodiments of the invention enable searching and result merging across heterogeneous indices, which include structured, unstructured and semi-structured data sources. For example, some of them may be relational databases, some of them may be XML databases and the others may be keyword search indices. Search results returned from the data sources are semantically different, but may be related.

Embodiments of the invention enable searching and result merging at an entity level. Each entity has a hierarchical structure, e.g., books have chapters, chapters have sections and sections have pages. A keyword search index may have information about the pages in a set of books while a relational database may have metadata information of the books (such as publisher). The invention calculates information content for the sub-queries sent to the two data sources as dynamic weights, groups the returned pages from the keyword search index to books to which they belong, merges the books from both data sources using the weights and then present the sorted books to users as final search results.

It is important to note that embodiments of the invention do not assume or require close cooperation of component search engines (data sources). When data sources do not provide enough information to compute information content based scores, sampling can be used to learn those required parameters as discussed in several learning approaches, such as L. Si and J. Callan in "A Semisupervised Learning Method to Merge Search Engine Results," ACM Transactions of Information Systems, 21(4), (pp. 457-491) (2003).

Figure 3:
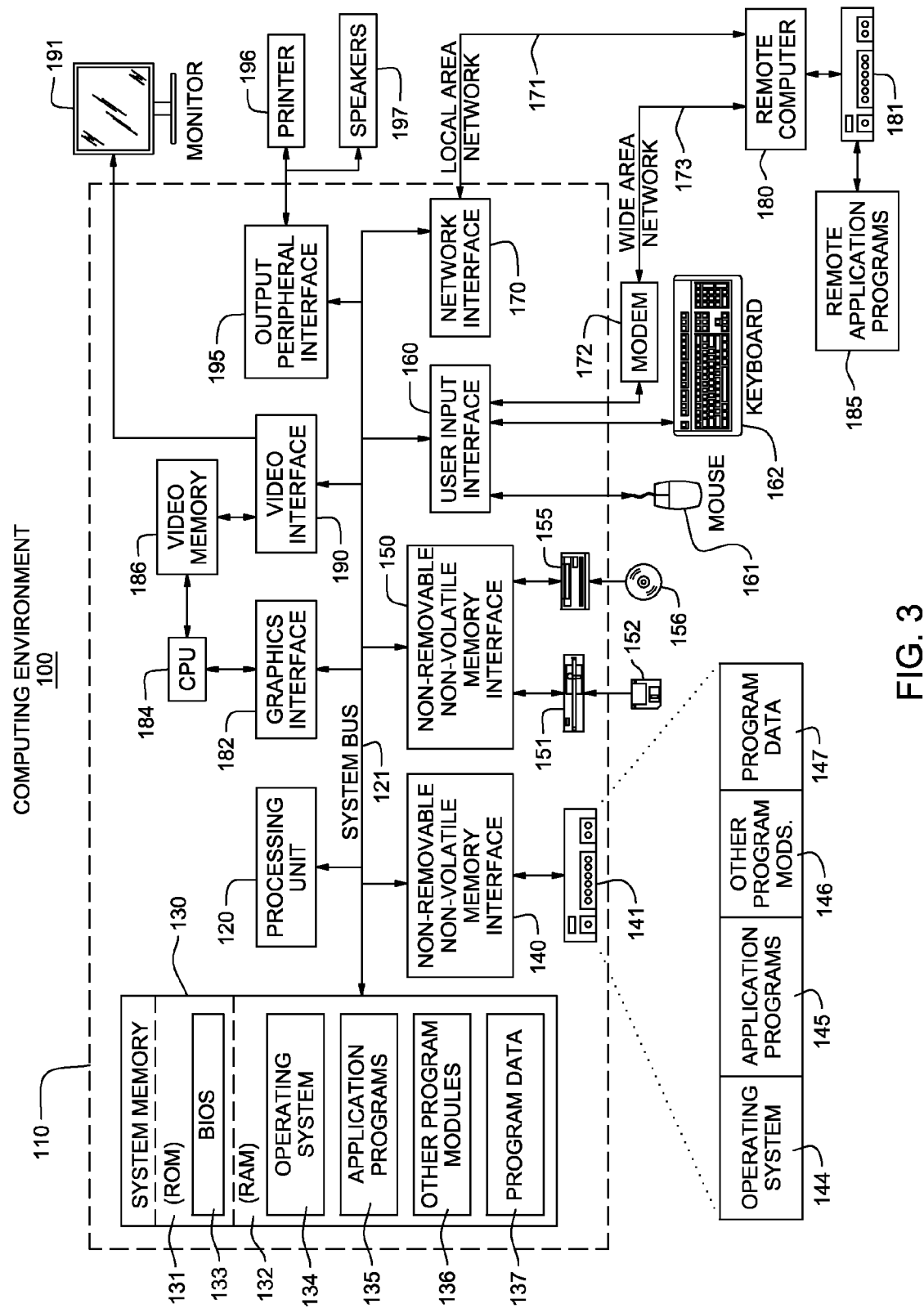
FIG. 3 illustrates a computing environment that may be used in embodiments of the invention.

With reference to FIG. 3, an exemplary system for implementing the invention includes a general purpose-computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrate a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3 provide storage of computer readable instructions, data structures, program modules and other data for the computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Operating System 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195. A graphics interface 182, such as Northbridge, may also be connected to the system bus 121. Northbridge is a chipset that communicates with the CPU, or host-processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a co-processor and thus a variety of co-processing devices may be included in computer 110.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

While it is apparent that the invention herein disclosed is well calculated to fulfill the objects described above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of merging search results, comprising:
   identifying a query from a user;
   splitting the query into sub-queries;
   calculating information content for each of the sub-queries, said information content representing information requirements of the user;
   executing each of the sub-queries to obtain a plurality of search results; and
   combining the search results based on the information content calculated for the sub-queries; wherein:
   the executing each of the sub-queries includes identifying a multitude of entities for at least one of the sub-queries, and executing each of the sub-queries in a respective one of a plurality of heterogeneous indices;
   said sub-queries include a first sub-query and a second sub-query;
   the executing each of the sub-queries includes executing the first sub-query to identify a plurality of first class entities, and executing the second sub-query to identify a multitude of second class entities, each of the second class entities being associated, according to a defined criteria, with a respective single first class entity;
   the combining includes clustering the second class entities into a plurality of clusters based on the first class entity to which each of the second class entities belongs, and assigning a relevance score to each of the clusters;
   the combining includes determining an importance value for each of the first class entities; and
   the assigning includes assigning a relevance score to each of the clusters based on the importance value of the first class entity with which the second class entities of said each cluster are associated.

2. The method according to claim 1, wherein:
   the heterogeneous indices include structured, unstructured and semi-structured data sources.

3. The method according to claim 1, wherein:
   the executing includes searching at an entity level, entities having a hierarchical structure; and
   the combining includes merging the search results at the entity level.

4. The method according to claim 1, wherein:
   the execution of each of the sub-queries includes identifying a multitude of search results for at least one of the sub-queries; and each of said clusters represents a high level entity.

5. The method according to claim 4, wherein:
   the combining includes determining the relevance score for each of the clusters based on relevance scores of the search results which form the cluster.

6. The method according to claim 4, wherein the combining further includes merging the clusters based on the relevance scores computed for the clusters and dynamic weights computed for the sub-queries.

7. The method according to Claim 1, wherein the executing each of the sub-queries includes executing each of the sub-queries using a respective single search engine.

8. The method according to claim 1, wherein the information content for each of the sub-queries is to represent the estimated relative importance of the sub-queries.

9. A system for merging search results, comprising one or more processing units configured for:
- identifying a query from a user;
- splitting the query into sub-queries;
- calculating information content for each of the sub-queries, said information content representing information requirements of the user;
- executing each of the sub-queries to obtain a plurality of search results; and
- combining the search results based on the information content calculated for the sub-queries; wherein:
- the executing each of the sub-queries includes identifying a multitude of entities for at least one of the sub-queries, and executing each of the sub-queries in a respective one of a plurality of heterogeneous indices;
- said sub-queries include a first sub-query and a second sub-query;
- the executing each of the sub-queries includes executing the first sub-query to identify a plurality of first class entities, and executing the second sub-query to identify a multitude of second class entities, each of the second class entities being associated, according to a defined criteria, with a respective single first class entity;
- the combining includes clustering the second class entities into a plurality of clusters based on the first class entity to which each of the second class entities belongs, and assigning a relevance score to each of the clusters;
- the combining includes determining an importance value for each of the first class entities; and
- the assigning includes assigning a relevance score to each of the clusters based on the importance value of the first class entity with which the second class entities of said each cluster are associated.

10. The system according to claim 9, wherein:
- the combining includes merging the clusters based on the relevance scores computed for the clusters.

11. The system according to claim 10, wherein the combining includes: determining a relevance score for each of the clusters based on the relevance scores of the search results which form the cluster; and
- merging the clusters based on the relevance scores computed for the clusters and dynamic weights computed for the sub-queries.

12. The system according to claim 9, wherein:
- the executing each of the sub-queries includes executing each of the sub-queries using a respective single search engine; and
- the information content for each of the sub-queries is based on estimated relative importance of the sub-queries.

13. An article of manufacture comprising:
- at least one computer usable device having computer readable program code logic tangibly embodied therein to execute instructions in one or more processing units for merging search results, said computer readable program code logic, when executing in the one or more processing units, performing the following:
- identifying a query from a user;
- splitting the query into sub-queries;
- calculating information content for each of the sub-queries, said information content representing information requirements of the user;
- executing each of the sub-queries to obtain a plurality of search results; and
- combining the search results based on the information content calculated for the sub-queries: wherein:
- the executing each of the sub-queries includes identifying a multitude of entities for at least one of the sub-queries, and executing each of the sub-queries in a respective one of a plurality of heterogeneous indices;
- said sub-queries include a first sub-query and a second sub-query;
- the executing each of the sub-queries includes executing the first sub-query to identify a plurality of first class entities, and executing the second sub-query to identify a multitude of second class entities, each of the second class entities being associated, according to a defined criteria, with a respective single first class entity;
- the combining includes clustering the second class entities into a plurality of clusters based on the first class entity to which each of the second class entities belongs, and assigning a relevance score to each of the clusters;
- the combining includes determining an importance value for each of the first class entities; and
- the assigning includes assigning a relevance score to each of the clusters based on the importance value of the first class entity with which the second class entities of said each cluster are associated.

14. The article of manufacture according to claim 13, wherein:
- the combining includes merging the clusters based on the relevance scores computed for the clusters.

15. The article of manufacture according to claim 14, wherein the combining includes:
- determining the relevance score for each of the clusters based on the relevance scores for each of the clusters based on the relevance scores of the search results which form the cluster; and
- merging the clusters based on the relevance scores computed for the clusters and dynamic weights computed for the sub-queries.

16. A method of searching and merging search results across heterogeneous indices, comprising:
- identifying a query from a user;
- splitting the query into sub-queries;
- calculating information content for each of the sub-queries, said information content representing information requirements of the user;
- executing each of the sub-queries by searching across heterogeneous indices, including structured, unstructured and semi-structured data sources, to obtain a multitude of search results;
- combining the search results based on the information content calculated for the sub-queries; wherein:
- the executing each of the sub-queries includes identifying a multitude of entities for at least one of the sub-queries, and executing each of the sub-queries in a respective one of a plurality of heterogeneous indices;
- said sub-queries include a first sub-query and a second sub-query;
- the executing each of the sub-queries includes executing the first sub-query to identify a plurality of first class entities, and executing the second sub-query to identify a multitude of second class entities, each of the second class entities being associated, according to a defined criteria, with a respective single first class entity;
- the combining includes clustering the second class entities into a plurality of clusters based on the first class entity to which each of the second class entities belongs, and assigning a relevance score to each of the clusters;

the combining includes determining an importance value for each of the first class entities; and the assigning includes assigning a relevance score to each of the clusters based on the importance value of the first class entity with which the second class entities of said each cluster are associated.

17. The method according to claim 16, wherein the data sources contain entities with a hierarchical structure, which has a plurality of hierarchical levels, and the combining includes merging the search results at the same hierarchical level.

18. The method according to claim 16, wherein:

the combining includes grouping said multitude of search results into a plurality of clusters, and computing the relevance score for each of said clusters based on relevance scores of the search results which form the cluster.

19. The method according to claim 17, wherein the combining further includes merging the clusters based on the relevance scores computed for the clusters and the information content calculated for the sub-queries.

* * * * *